United States Patent
Michael et al.

(10) Patent No.: US 7,649,616 B2
(45) Date of Patent: Jan. 19, 2010

(54) FIBER LASER LADAR

(75) Inventors: Christopher E. Michael, Crowley, TX (US); Bruno J. Evans, Keller, TX (US); Lionel D Liebman, Plano, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 822 days.

(21) Appl. No.: 10/886,976

(22) Filed: Jul. 8, 2004

(65) Prior Publication Data
US 2009/0316134 A1 Dec. 24, 2009

(51) Int. Cl.
*G01C 3/08* (2006.01)
(52) U.S. Cl. .................................................. 356/4.01
(58) Field of Classification Search ....... 356/3.01–3.15, 356/4.01–4.1, 5.01–5.15, 6–22
See application file for complete search history.

(56) References Cited

U.S. PATENT DOCUMENTS

| | | | |
|---|---|---|---|
| 5,847,816 A * | 12/1998 | Zediker et al. ............. 356/5.09 |
| 6,246,468 B1 * | 6/2001 | Dimsdale ................... 356/4.02 |
| 6,801,550 B1 | 10/2004 | Snell .............................. 372/6 |
| 2003/0030001 A1 * | 2/2003 | Cooper et al. ............ 250/338.5 |
| 2003/0202168 A1 * | 10/2003 | Barenz et al. ............... 356/4.01 |

\* cited by examiner

*Primary Examiner*—Thomas H Tarcza
*Assistant Examiner*—Luke D Ratcliffe
(74) *Attorney, Agent, or Firm*—Williams Morgan & Amerson, P.C.

(57) ABSTRACT

A laser radar system and a method for use in a laser radar system are disclosed. More particularly, the laser radar system includes a fiber laser capable of generating a laser signal; a first optical path through which the generated laser signal may be transmitted; a second optical path through which a reflection of the transmitted laser signal may be received; and a detector capable of detecting the received reflection. The method includes generating a laser signal from a fiber laser; transmitting the laser signal; receiving a reflection of the transmitted laser signal; and detecting the reflection.

27 Claims, 3 Drawing Sheets

FIBER LASER LADAR

BACKGROUND OF THE INVENTION

1. Field of the Invention

The present invention pertains to laser detection and ranging ("LADAR") systems and, more particular, to a LADAR system employer a fiber laser light source.

2. Description of the Related Art

A need of great importance in military and some civilian operations is the ability to quickly detect and identify objects, frequently referred to as "targets," in a "field of view." Techniques for identifying targets have existed for many years in military contexts. For instance, in World War II, the British developed and utilized radio detection and ranging ("RADAR") systems for identifying the incoming planes of the German Luftwaffe. RADAR uses radio waves to locate objects at great distances even in bad weather or in total darkness. Sound navigation and ranging ("SONAR") has found similar utility and application in environments where signals propagate through water, as opposed to the atmosphere. While RADAR and SONAR have proven quite effective in many areas, they are inherently limited by a number of factors. For instance, RADAR is limited by its use of radio frequency signals and the size of the resultant antennas used to transmit and receive such signals. Sonar suffers similar types of limitations.

The art consequently developed and deployed a variety of alternative technologies. One such alternative technology is laser detection and ranging ("LADAR"). Similar to RADAR systems, which transmit radio waves and receive radio waves reflected from objects, LADAR systems transmit laser beams and receive reflections from targets. Because of the short wavelengths associated with laser beam transmissions, LADAR data exhibits much greater spatial resolution than RADAR data. LADAR systems are therefore useful in many applications for locating and identifying objects including, in military environments, automatic target recognition ("ATR") systems. However, LADAR's versatility has led to its application in a variety of contexts. For instance, LADAR systems are sometimes used in navigation as range finders, etc.

A number of LADAR systems have been developed. Of significant importance to LADAR systems is the hardware that transmits the laser beam and the hardware that receives the reflected signals. Frequently, this hardware is combined into a single "transceiver." Exemplary LADAR transceiver technology is disclosed in the following U.S. patents:

- U.S. Letters Patent 4,085,910, entitled "Dual Mode Optical Seeker for Guided Missile Control", issued Apr. 25, 1978, to Northrop Corporation as assignee of the inventor(s) William G. Baker, et al.;
- U.S. Letters Patent 4,515,471, entitled "Scanning Laser Radar", issued May 7, 1985, to LTV Aerospace and Defense Company as assignee of the inventor(s) Dayton D. Eden;
- U.S. Letters Patent 4,515,472, entitled "Agile Receiver for a Scanning Laser Radar", issued May 7, 1985, to LTV Aerospace and Defense Co. as assignee of the inventor(s) Albert B. Welch;
- U.S. Letters Patent 4,528,525, entitled "Scanning Laser for a Scanning Laser Radar", issued Jul. 9, 1985, to LTV Aerospace and Defense as assignee of the inventor(s) Dayton D. Eden, et al.;
- U.S. Letters Patent 5,200,606, entitled "Laser Radar Scanning System", issued Apr. 6, 1993, to LTV Missiles and Electronics Group as assignee of the inventor(s) Nicholas J. Krasutsky, et al.;
- U.S. Letters Patent 5,224,109, entitled "Laser Radar Transceiver", issued Jun. 29, 1993, to LTV Missiles and Electronics Group as assignee of the inventor(s) Nicholas J. Krasutsky, et al.;
- U.S. Letters Patent 5,701,326, entitled "Laser Scanning System With Optical Transmit/Reflect Mirror Having Reduced Received Signal Loss", issued Dec. 23, 1997, to Loral Vought Systems Corporation as assignee of the inventor(s) Edward Max Flowers; and
- U.S. Letters Patent 6,262,800, entitled "Dual Mode Semi-Active Laser/Laser Radar Seeker", issued Jul. 17, 2001, to Lockheed Martin Corporation as assignee of the inventor(s) Lewis G. Minor.

The patents are listed in chronological order by date of issuance. Note that this list is exemplary only, and is not exhaustive.

Most of these conventional LADAR transceivers employ a diode pumped solid state laser ("DPSSL"). The laser beam is manipulated by discrete optical components that require alignment and have unavoidable reflective losses. The transmitted and received signals are separated by a hole mirror or a polarizing beam splitter. The received signals are focused into an optical fiber and routed to electronic circuitry that captures and processes them.

However, performance requirements for LADAR systems continually demand higher performance. These requirements pressure current standards for signal handling efficiency and signal quality, as well as system cost, size and weight. Furthermore, ruggedization is becoming more important as LADAR systems are deployed in ever more difficult environments. This is particularly important in LADAR systems with respect to the alignment of the optics.

The present invention is directed to resolving, or at least reducing, one or all of the problems mentioned above.

SUMMARY OF THE INVENTION

The invention includes, in its various aspects and embodiments, a laser radar system and a method for use in a laser radar system. More particularly, the laser radar system comprises a fiber laser capable of generating a laser signal; a first optical path through which the generated laser signal may be transmitted; a second optical path through which a reflection of the transmitted laser signal may be received; and a detector capable of detecting the received reflection. The method comprises generating a laser signal from a fiber laser; transmitting the laser signal; receiving a reflection of the transmitted laser signal; and detecting the reflection.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
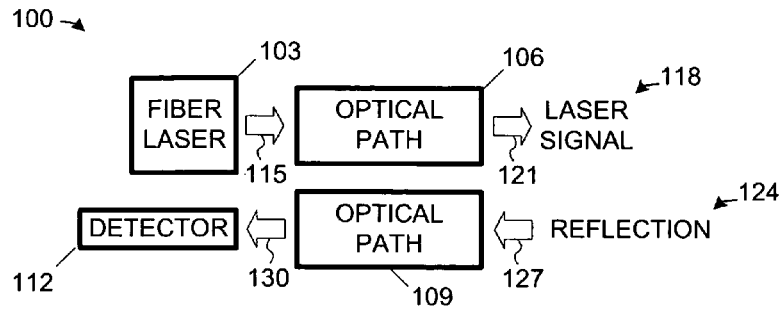
FIG. 1 illustrates, in a conceptualized block diagram, one particular embodiment of a LADAR system in accordance with the present invention.

FIG. 1 depicts, in a conceptualized block diagram, one particular embodiment of a LADAR system 100 in accordance with the present invention. The LADAR system 100 comprises a fiber laser 103, a first optical path 106, a second optical path 109, and a detector 112. The fiber laser 103 is capable as, represented by the arrow 115, of generating a laser signal 118 that is transmitted through the first optical path 106, as represented by the arrow 121. Thus, the first optical path 106 may also be referred to as the "transmission optical path." One or more reflections 124 are received, as represented by the arrow 127, from the field of view through the second optical path 109 to be detected, as represented by the arrow 130, by the detector 112. Thus, the second optical path may be referred to as a "receive optical path."

Figure 2:
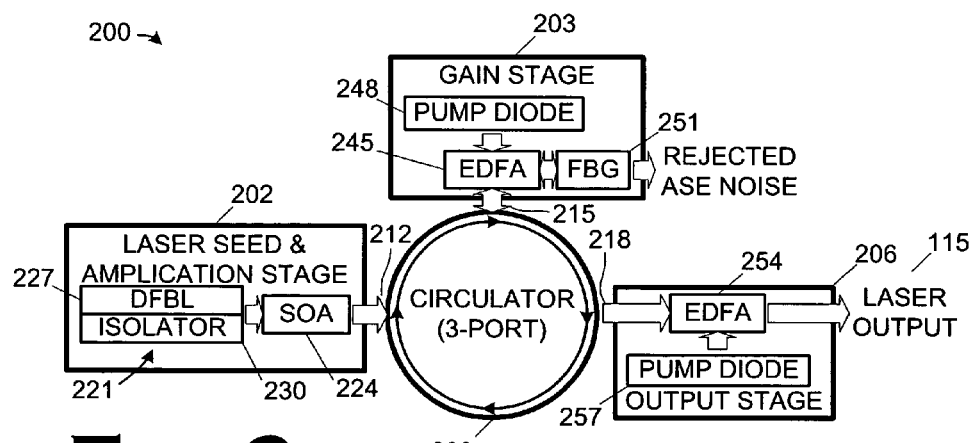
FIG. 2 illustrates one particular embodiment of the fiber laser of FIG. 1.

FIG. 2 illustrates one particular embodiment 200 of the fiber laser 103 of FIG. 1. Fiber lasers and their components are well known in the telecommunications arts, but are not found in the LADAR arts. In general, the fiber laser 103 in the embodiment 200 comprises three stages: a laser seed and amplification stage 202, a gain stage 203, and an output stage 206. A three-port circulator 209 controls the configuration of the path of the laser signal first generated by the laser seed and amplification stage 202 through the fiber laser 103. In general, the laser seed and amplification stage 203 generates a laser signal, as represented by the arrow 212, that is directed by the circulator 209 to the gain stage 203, as indicated by the arrow 215. The gain stage 203 amplifies the laser signal and filters out noise, e.g., in the form of amplified spontaneous emissions ("ASE"). The amplified, filtered laser signal is then directed by the circulator 209, as indicated by the arrows 215, 218 to the output stage 206. The output stage 206 once again amplifies and then outputs the laser signal 115. Note that the output stage 206 can, in the illustrated embodiment, function as a preamp for the detector 112, shown in FIG. 1.

More technically, the laser seed and amplification stage 202 includes a laser seed 221 and semiconductor optical amplifier ("SOA") 224. The seed 221 comprises a directly modulated, distributed feedback laser ("DFBL") 227 and an isolator 230. The DFBL 227 actually generates the laser signal in the first instance. The isolator 230 protects the DFBL 227 by blocking backscatter, i.e., reflections of the laser signal caused by encountering the components of the fiber laser 103. As will be appreciated by those skilled in the art having the benefit of this disclosure, when the laser signal encounters a component such as, for example, the circulator 209, the gain stage 203, or the output stage 206, a portion of the laser signal is reflected back down the optical path. This "backscatter", if not blocked, interferes with the operation of the DFBL laser 227. Hence, the inclusion of the isolator 230 to shield the DFBL laser 227. Note that the isolator 230 is tuned to block the backscatter without hindering the transmission of the laser signal.

Note that different types of optical isolators may be used in different embodiments. If the output from the DFBL 237 is highly polarized, then a simple polarizing isolator may be used. Whether to use a single or double stage isolator will depend on the isolation requirements of the DFBL 237. The wavelength of the isolator 230 will be centered on the output frequency of the DFBL 237. If the system is based on EDFAs, as is the illustrated embodiment, then that wavelength will be approximately 1.55 um.

In general, the illustrated embodiment includes several isolators at various points. The isolators in the system will be chosen based on the needs of the system at the points where they are employed. The isolator 221 after the DFBL 227 will have to have very low reflectance (the light coming out of the DFBL 227 must not reflect back into the DFBL 227), and very good isolation (light coming into the output end of the isolator 221 must be extinguished at the isolator 221. Isolators used elsewhere in the system are polarization insensitive due to the non-polarization maintaining nature of the fiber optics and amplifiers. These might accentuate transitivity over isolation, although this is not likely). There is not a whole lot of tuning to do with isolators since their performance does not vary greatly between implementations. Isolators are used to prevent random and backscattered light from traveling back through the system and quenching the gain of the EDFAs. All isolators will be chosen for the signal wavelength of 1.55 um in the illustrated embodiment.

The circulator 209 is a three-port, optoelectric device useful for wavelength multiplexing signals. The circulator 209 directs the propagation of the laser signal, indicated by the arrow 212, from the laser feed and amplification stage 202, to the gain stage 203, and then to the output stage 206. Such circulators are known in the telecommunications arts and any suitable circulator known to that art may be used.

More particularly, the circulator 209 routes the signal from seed to gain to output. In the case where a 4 port circulator is used it also routes the signal to the detector. A circulator is module that has three or four ports. In one implementation of a circulator, light enters one port and is split into two polarizations by a polarized beam splitter ("PBS"). Those two polarizations are rotated and recombined and the recombined light is output through the next port. Light coming into that next port is also separated and rotated. When the rotated light encounters the PBS it is sent along a different optical path from the first port is transmitted out the third port. This can be repeated once more for a 4 port circulator. The circulator 209 in the illustrated embodiment is rated to handle the high powers of the system and made for a wavelength of 1.55 um, which is a standard wavelength.

The circulator 209 directs the laser signal, represented by the arrow 212, from the laser seed and amplification stage 202 to the gain stage 203. The gain stage 203 comprises an Erbium-doped, fiber amplifier ("EDFA") 245 pumped by a pump diode 248 and/or one or more narrow-band, fiber Bragg Gratings ("FBG") 251. EDFAs and FBGs are well known in the telecommunications arts, and suitable, commercial, off-the-shelf EDFAs and FBGs are available from vendors in this art. Any suitable EDFA and/or FBG known to the telecommunications arts may be used to implement the EDFA 245 and FBG(s) 251.

The EDFA 245 amplifies the laser signal received via the circulator 209, as indicated by the arrow 215. The EDFA 245 gets the energy that it transfers to laser signal from the pump diode 248. Pump diodes such as the pump diode 248 are powered by a DC current. Typically, a unit (not shown) is employed to regulate the current to the pump diode 248 to ensure that it is not damaged. Pump diodes are essentially high power diode lasers that have been "fiber coupled", that is their laser light output is directed into an optical fiber. The laser light from the pump diodes 248 is of a certain frequency such that it excites the EDFA 245. The laser light of the signal is of a certain frequency such that when it enters an excited EDFA 245 the EDFA 245 releases its energy as laser light. The laser light of the signal thus effectively amplified.

The FBG(s) 251 are tuned to reflect only the laser and pump wavelengths of the laser signal and permit the ASE to propagate through and out of the fiber laser 103. The FBG 251 is a length of optical fiber that has been designed to reflect one specific frequency of light. It is used in this application to reflect the signal frequency as it exits the EDFA 245 so that the signal propagates once again through the EDFA 245 and is further amplified. A second FBG 251 can be used to reflect pump laser light when it will improve the system performance. In general, FBGs 251 are fabricated by writing a diffraction grating into a short length of optical fiber and are well known in the telecommunications arts. Each FBG 251 reflects one particular wavelength and transmits all others. Multiple FBGs 251 can be multiplexed in series along a single optical fiber to filter a spectrum of noise. The rejection of the ASE in this manner improves the signal-to-noise ratio ("S/N ratio") of the laser signal, and therefore the quality of the laser signal. The "improved" laser signal is reflected back through the EDFA 245, as indicated by the arrow 215, whereupon it is amplified once again, and then to the circulator 209.

The circulator 209 then directs the laser signal to the output stage 209, as indicated by the arrow 218. The output stage 206 comprises a second EDFA 254 powered by a second pump diode 257. The EDFA 254 amplifies the laser signal once again, and outputs the generated laser signal, as represented by the arrow 115. The generated laser signal is output to the first optical path 106, shown in FIG. 1, as discussed above.

Note that some portions of the embodiment 200 may be "optimized" or "tuned" for use in any given embodiment to, e.g., provide higher amplification. For instance, the laser signal will inherently include some noise in the form of amplified spontaneous emissions ("ASE"). The object of the tuning is to achieve a desired level of amplification for the laser signal while controlling the level of noise introduced into the signal by that amplification Such tuning will be implementation specific, depending on the optical characteristics of the components in the LADAR transceiver 300. Suitable tuning techniques are known to the telecommunications arts and can be readily adapted to the present invention by those skilled in the art having the benefit of this disclosure. One suitable reference for device level tuning is "Erbium-Doped Fiber Amplifiers" by P. C. Becker, Academic Press, May 15, 1999 (ISBN 0120845903).

For instance, with respect to the gain stage 203 and the output stage 206, two important characteristics in this tuning are the length of the optical path provided by the optical fibers and the power of the pump diodes 248, 257. The EDFAs 245, 254, as mentioned before, are excited by the pump diodes 248, 257. When the EDFAs 245, 254 are in this excited state, the erbium ions can spontaneously release their energy in the form of a photon at the signal wavelength. This is not part of the signal and is referred to as noise, or amplified spontaneous emission ("ASE"). As this photon moves along the length of the EDFA 245, 254, it stimulates other Erbium ions to release their energy.

The length of the EDFAs 245, 254 thus is a factor in determining the amplitude of the noise level. When this ASE noise is generated, it is essentially taking away from the number of excited erbium ions that are available for amplifying the signal. If the EDFA 245, 254 is sufficiently long then the ASE will use up all the erbium ions and the EDFA 245, 254 will effectively attenuate the signal. The number of excited erbium ions available for signal amplification may be increase by increasing the power of pump diode laser light (i.e., to increase the number of photons traveling through the EDFA 245, 254 at the correct wavelength). Thus, pump diode power, EDFA length, and acceptable noise have to be balanced to achieve the results desired.

Returning to FIG. 1, the first and second optical paths 106, 109 are illustrated as being independent of one another. However, this is not necessary to the practice of the invention. Where size, weight, and/or cost, for instance, are important design constraints, some embodiments may employ some electro-optical devices in both transmission and receipt, such that the first and second optical paths 106, 109 may overlap. That is, in some embodiments, the first and second optical paths 106, 109 may comprise common components. One such embodiment is discussed immediately below relative to FIG. 3.

Figure 3:
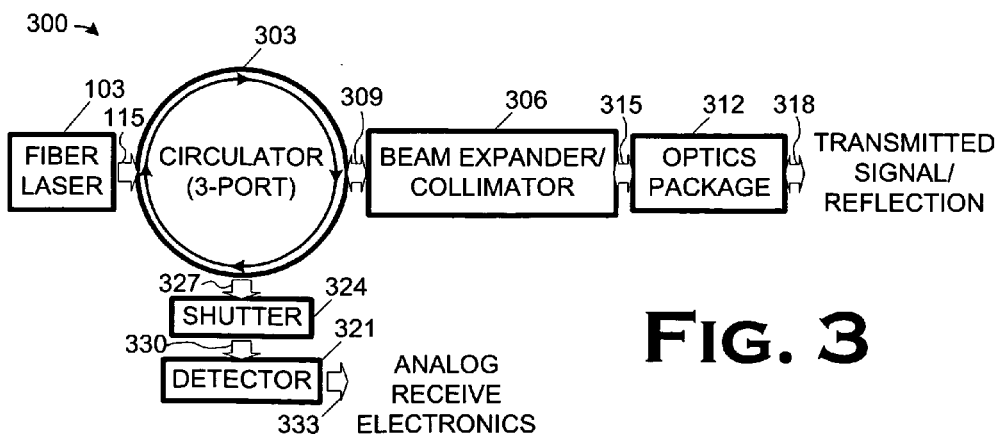
FIG. 3 illustrates a LADAR transceiver that is one particular embodiment of the LADAR system of FIG. 1.

FIG. 3 illustrates a LADAR transceiver 300 that is one particular embodiment of the LADAR system 100 of FIG. 1. The fiber laser 103 generates a laser signal, as represented by the arrow 115, as described above. The fiber laser 103 of FIG. 3 may be implemented in the embodiment 200 of FIG. 2. A three-port circulator 303 directs the laser signal, represented by the arrow 115, to a beam expander/collimator 306, as represented by the arrow 309. The beam expander/collimator 306 comprises a series of (negative and positive) lenses (not individually shown) which are adapted to expand the diameter of the laser signal, suitably by an 8:1 ratio, while decreasing the divergence of the beam of the laser signal. Beam expanders/collimators are known in the optical arts, and any one known to the art suitable for this application may be employed. The beam expander/collimator 306 expands and collimates the laser signal as it propagates to the optics package 309, as represented by the arrow 312.

Thus, the beam expander/collimator 306 provides a means for shaping the beam consistent with the application of the LADAR transceiver 300. Generally, and more technically, the beam expander/collimator 306 widens the beam to lessen the impact of surface imperfections on beam quality. Note, however, that the beam expander/collimator 306 is, by way of example and illustration, but one means for shaping the beam. Other means may be employed in alternative embodiments.

For instance, some embodiments might employ means comprising separate, independent structures for expanding and collimating.

The design of the optics package 309 will be implementation specific, depending upon the end use of the LADAR transceiver 300. For instance, some LADAR systems employ what is known as a "scan illumination" technique, such as those disclosed in some of the aforementioned patents. Typically, the optics package of a scanning LADAR system is gimbaled to implement the scanning capability. However, many LADAR systems use what is known as a "flash" illumination technique. The optics package in a flash illumination LADAR system typically is not gimbaled. The present invention may be employed in either a scanned illumination or a flash illumination implementation. Accordingly, the optics package 312 may be gimbaled or not.

Other variations may also be found in the design of the optics package. Many LADAR systems pulse the laser signal, as opposed to transmitting a continuous beam. Thus, some implementations of the optics package 312 may include electronics for pulsing the laser signal. Similarly, because of many inherent performance advantages, split beam laser signals are typically employed by most LADAR systems. A single beam may be split into several beamlets spaced apart from one another by an amount determined by the optics package. Thus, some implementations of the optics package 312 may include what is known as a "beam splitter" to split the beam of the laser signal into a plurality of beamlets. The aforementioned patents listed immediately above disclose techniques for both pulsing and splitting the beam of the laser signal.

The optics package 316 may implement these capabilities, as well, in any permutation in various alternative embodiments. For instance, some embodiments may pulse a single beam while others may continuously transmit a plurality of beamlets. Both of these permutations may be employed in either flash or scanned illumination systems. In the illustrated embodiment, however, the optics package 312 transmits a pulsed beam comprising a plurality of beamlets in a scanned illumination technique. Other structures aside from those discussed above may also be employed, such as scanning mirrors, quarter wave plates, telescopes, fold mirrors, etc.

The optics package 312 actually transmits the laser signal, as indicated by the arrow 318, into the environment. More particularly, the LADAR system "paints" a field of view, either by flashing it or by scanning it. In accordance with conventional practice, various objects (not shown) within the field of view reflect the transmitted signal(s) back to the LADAR transceiver 300. The reflection(s) are received, as indicated by the arrow 318, by the optics package 312 of the LADAR transceiver 300. Thus, the optics package 312 both transmits the laser signal and receives the reflection(s). The optics package 312 consequently provides both a means for transmitting the laser signal and a means for receiving a reflection of the transmitted laser signal. However, this is not necessary to the practice of the invention. Some alternative embodiments may, for instance, employ separate optics packages for transmitting the laser signal and for receiving the reflection(s). Thus, the optics package 312 is, by way of illustration and example, but one means for transmitting and receiving and other means may be employed in alternative embodiments.

The design of the optics package 312 with respect to receiving the reflection(s) will also be implementation specific. The considerations for optical design include, among other things, beam expander design, transmit/receive switch design (if not using the circulator to separate the return), optical scanner design, and the telescope design. All the optics need to be designed to operate at the signal laser wavelength (1.5 um). The beam expander will set the beam size which will impact the rest of the design. The scanner will determine how large an area the LADAR can scan at what rate. The telescope (or lack of one) will determine the far field resolution. Thus, these types of factors will vary depending upon the particular implementation.

As indicated by the arrow 315, the received reflection(s) are then output to and shaped by the beam expander/collimator 306. The shaped reflection is output from the beam expander/collimator 306 to the circulator 303, as indicated by the arrow 309, which directs it to the detector 321 via the shutter 324, as indicated by the arrows 327, 330. Note that the circulator 303, beam expander/collimator 306, and optics package 312 are employed in both the transmission (i.e., "first") optical path and the receive (i.e., "second") optical path. Hence, the circulator 303, beam expander/collimator 306, and optics package 312 are common to both the optical paths.

In general, the shutter 324 protects the detector 321 from backscatter (not shown) in the receive optical path of the LADAR transceiver 300 by blocking the transmission of any signal to the detector 321 while the fiber laser 103 is firing. As was noted above, when the laser signal is fired from the fiber laser 103, backscatter is generated as the laser signal propagates through the optical path and encounters other components such as the circulator 303, beam expander/collimator 306, and optics package 312. Because the transmit and receive optical paths overlap, or contain common components, the backscatter can be transmitted through the receive optical path to the detector 321. Thus, just as the isolator 230 protects the DFBL 227, both shown in FIG. 2, from backscatter, the shutter 324 protects the detector 321 from the backscatter. Note, however, that such backscatter is not a problem in the receive optical path where the transmit and receive optical paths are separate, e.g., contain no common components. Thus, the shutter 324 is optional. Furthermore, in some embodiments, the backscatter may be attenuated or sufficiently small that it poses no danger to the detector 321 such that the shutter 324 may be omitted. Where used, however, the shutter 324 may be implemented with, for instance, a fast variable optical attenuator ("VOA") or a mechanical, optical switch, neither of which are otherwise shown.

The detector 321 may be implemented using any suitable optical detector known to the art to be compatible with an optical fiber. For instance, the detector 321 may be a P/N ("PIN") optical detector or an avalanche photodiode ("APD") optical detector.

The detected signal is then output by the detector 321 to the analog receive electronics, as indicated by the arrow 333. The analog receive electronics, not otherwise shown, may be any suitable electronics package known to the art. Note that this implies that existing LADAR-based systems can be retrofitted with the LADAR transceiver 300, since the detected signal can be used with existing receive electronics. Typically, the analog receive electronics captures the detected signal and processes it for whatever end purpose is desired. As mentioned above, the illustrated embodiment employs a pulsed, split beam, and the analog receive electronics may be referred to as "pulse capture electronics." Suitable pulse capture electronics for use with the present invention are disclosed in some of the aforementioned patents. These patents all describe the data acquisition electronics, or "pulse capture electronics" ("PCE"), of the LADAR system. However, alternative embodiments may employ other analog receive electronics packages.

As is implied above, the laser signal and the reflection(s), indicated by the arrows 115, 309, 315, 327, and 330, are transmitted over optical fibers, which are not otherwise shown. Any suitable technique known to the art may be used to physically interface the is optical fibers to the components. Generally, the optical fibers may be fused to the optoelectric components (e.g., the circulator 303, beam expander/collimator 306) to lessen the risk of damage to the ends of the optical fibers. However, other techniques may be alternatively employed.

Figure 4:
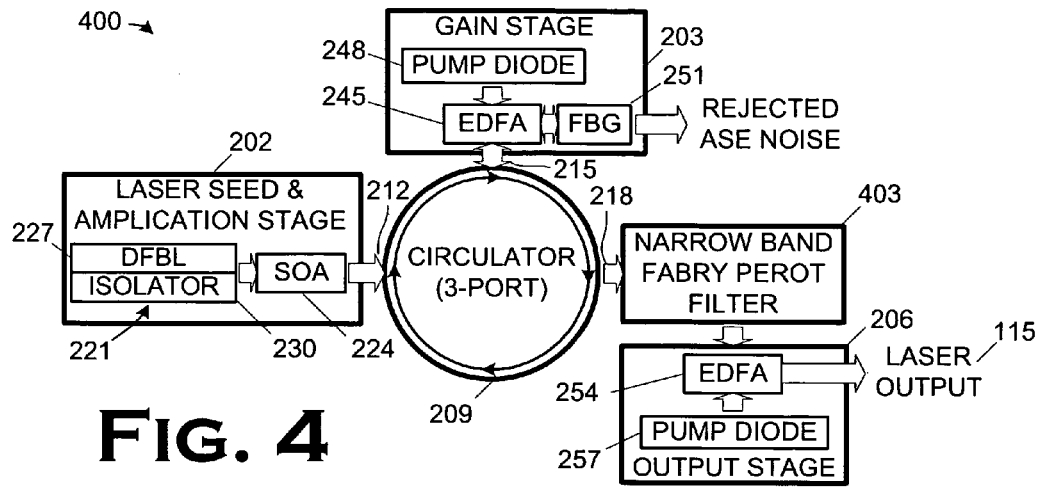
FIG. 4 illustrates a second particular embodiment of the fiber laser of FIG. 1 alternative to that illustrated in FIG. 2.

Note that the invention admits variation in the implementation of the fiber laser 103. FIG. 4 illustrates a illustrates a second particular embodiment 400 of the fiber laser of FIG. 1 alternative to that illustrated in FIG. 2. In the embodiment 400, a narrow band Fabry Perot filter 403 is added between the circulator 209 and the output stage 206. The narrow band Fabry Perot filter 403 removes background radiation and ASE noise from the laser signal and the reflection(s).

Figure 5:
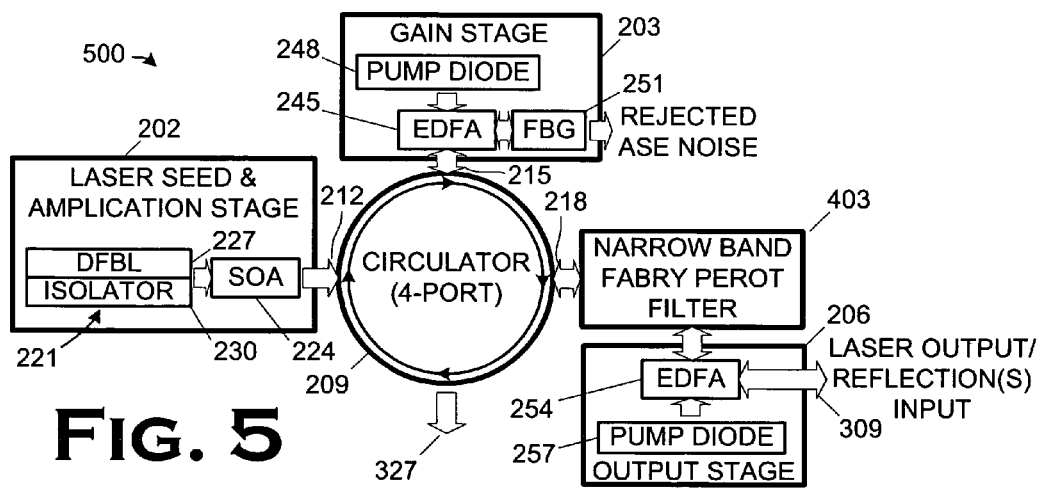
FIG. 5 illustrates a third particular embodiment of the fiber laser of FIG. 1 in which portions of the fiber laser are in the receive optical path for a LADAR transceiver.
Figure 6:
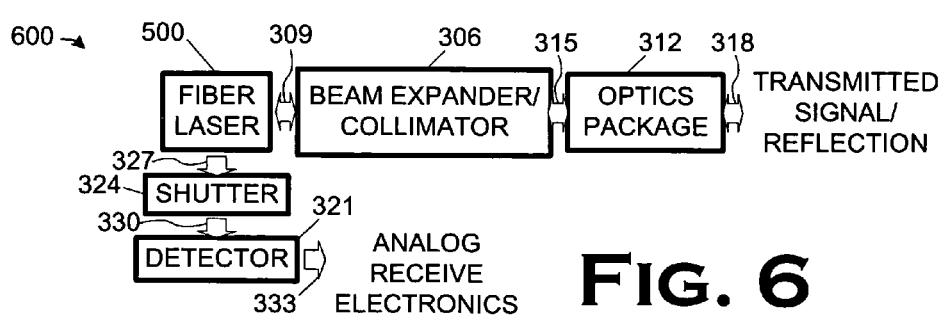
FIG. 6 illustrates a LADAR transceiver that is a second particular embodiment of the LADAR system in FIG. 1 employing the fiber laser of FIG. 5.

FIG. 5 illustrates a third alternative embodiment 500 for the fiber laser 103 in FIG. 1. In the embodiment 500, the circulator 209 of the fiber laser is in the receive optical path for the LADAR transceiver 600, shown in FIG. 6. This permits the elimination of the circulator 303, shown in FIG. 3. Furthermore, the narrow band Fabry Perot filter 403 removes ASE noise and background radiation from the laser signal and the reflection(s). Relative to the embodiment 200, shown in FIG. 2 and the embodiment 400, shown in FIG. 4, since the narrow band Fabry Perot filter 403 comprises a portion of the receive optical path, the reflection(s) signal(s) detected by the detector 321 will be of higher quality. The higher quality will result from the action of the Fabry Perot filter 403 in filtering the background radiation from the reflection(s).

Figure 7:
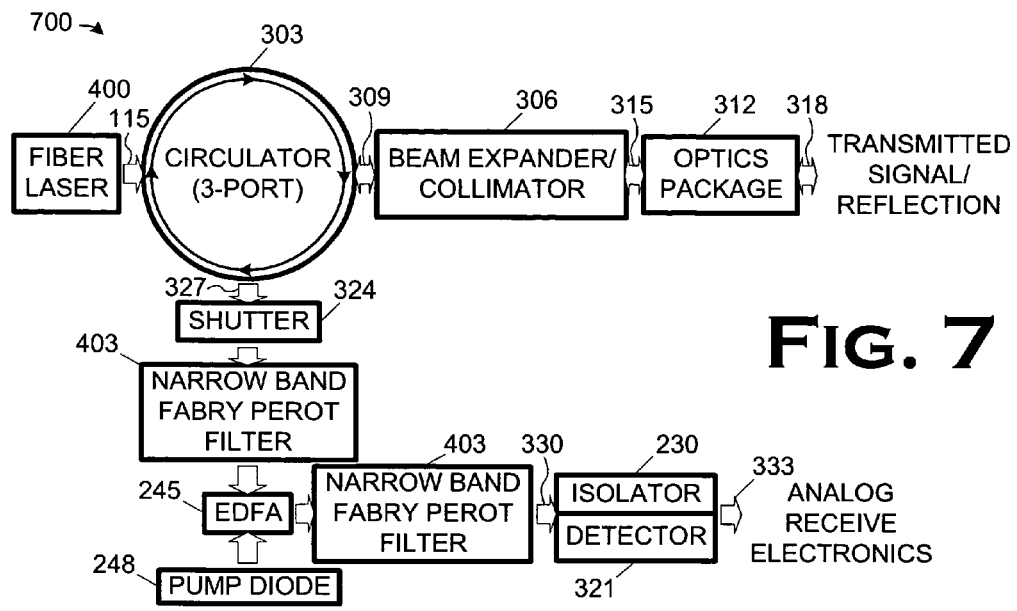
FIG. 7 illustrates a third particular embodiment of a LADAR transceiver that is a third particular embodiment of the LADAR system in FIG. 1 intended for use as a short range navigational aide.

Turning now to FIG. 7, the present invention also admits variation in the design of the LADAR systems in which it may be used, depending on the intended mission. The LADAR transceiver 500 of FIG. 5 employs the fiber laser embodiment 400, shown in FIG. 4, and has modified the receive optical path of the LADAR transceiver 300, shown in FIG. 3. The LADAR transceiver 700 is intended for use as a short range navigational aide, e.g., for a vehicle of some kind. The vehicle may be, for example, an unmanned ground vehicle ("UGV"), an unmanned aerial vehicle ("UAV"), a subsea, submersible, remotely operated vehicle ("ROV"), or a spacecraft.

More particularly, in the LADAR transceiver 700, the reflection(s) transmitted through the shutter 324 pass through a narrow band Fabry Perot filter 403 to remove background radiation and other noise therefrom. The filtered reflection(s) are then amplified by an EDFA 245 pumped by a pump diode 248. Note that the filters 403 and EDFA 245 will be tuned for this particular design as was discussed above. Amplification of the reflection(s) by the EDFA 245 will also amplify noise such as ASE, which is then removed by another narrow band Fabry Perot filter 403. The filtered, amplified reflection(s) are then output, as indicated by the arrow 330, to the detector 321. The detector 321 is protected from backscatter escaping the shutter 324 by an isolator 230. The detector 321 then outputs a signal indicative of the detected reflection(s) to the analog receive electronics, as indicated by the arrow 333.

Figure 8:
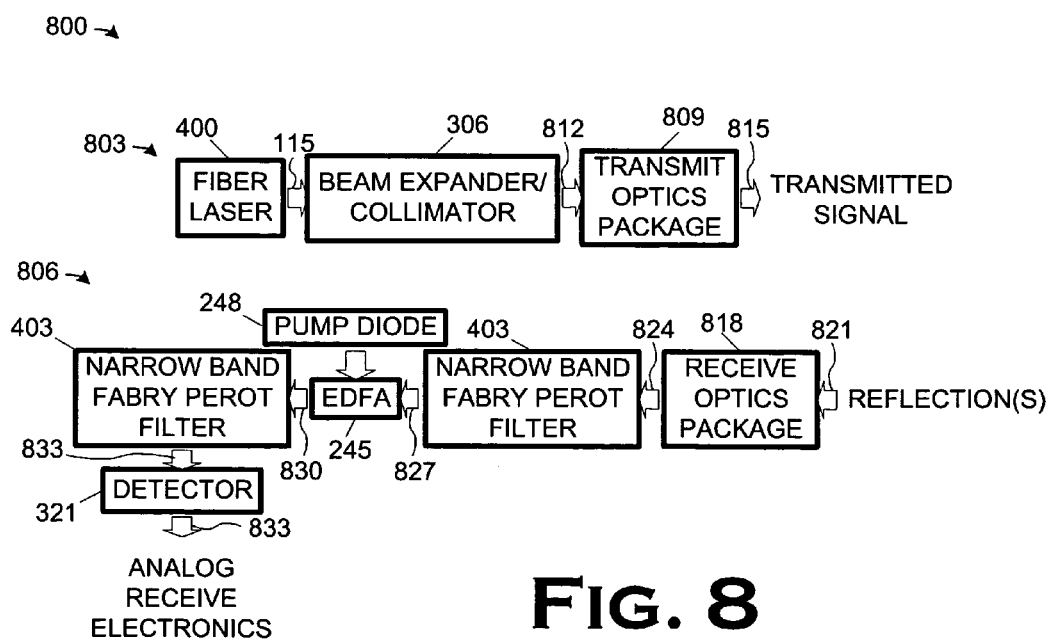
FIG. 8 illustrates a fourth particular embodiment of the LADAR system of FIG. 1 in which the transmit and receive optical paths are independent.

Note, however, that the present invention is not limited to application in LADAR systems that are "transceivers," i.e., that both transmit and receive. FIG. 8 illustrates a LADAR system 800 in which a first, transmission optical path 803 is independent of a second, receive optical path 806. Since the optical paths 803, 806 are independent, they can be segregated into separate pieces of equipment and even separated by a significant distance. Thus, the LADAR system 800 need not necessarily constitute a transceiver, although it could be implemented as such.

The transmission optical path comprises a fiber laser 400, shown in greater detail in FIG. 4, that generates and transmits a laser signal, as indicated by the arrow 115, to a beam expander/collimator 306. The beam expander/collimator 306 shapes the laser signal and outputs the shaped laser signal to the transmit optics package 809, as indicated by the arrow 812. The transmit optics package 809 then transmits the laser signal into the environment, as indicated by the arrow 815. In this particular embodiment, the laser signal is a pulsed, split beam signal and is scanned, as was discussed above.

The reflection(s) of the laser signal are received by the receive optics package 818, as indicated by the arrow 821. The received reflection(s) are output by the receive optics package 818 to the narrow band Fabry Perot filter 403, as indicated by the arrow 824, which filters background radiation and other noise from the received reflection(s). The filtered reflection(s) are output, as indicated by the arrow 827, to the EDFA 245. The EDFA 245 is powered by the pump diode 248 and amplifies the filtered reflection(s). The amplified reflection(s) are then output to the narrow band Fabry Perot filter 403, as indicated by the arrow 830, which filters out the ASE and other noise. Note that the EDFA 245 and narrow band Fabry Perot filters 403 will be tuned as was discussed above. The filtered, amplified reflection(s) are output to the detector 321. The detector 321 then outputs a signal indicative of the detected reflection(s) to the analog receive electronics, as indicated by the arrow 833.

Thus, the present invention admits wide variation in implementing both the fiber laser and the LADAR system as a whole. In its various embodiments and aspects, the present invention presents one or more of the following advantages and/or benefits relative to conventional LADAR systems:

- improved laser light generation efficiency: the efficiency of laser light generation is improved by amplifying the pulse in an EDFA, reflecting the pulse off a Fiber Bragg Grating ("FBG"), and again amplifying the pulse in the same EDFA;
- improved receive optics efficiency: the efficiency of the receive optics is improved by using fiber optic components to manipulate the signal because fiber optic components often have lower insertion and reflection losses than discrete optical components;
- improved system Signal to Noise Ratio ("SNR") of the system from optically amplifying the return signal with an EDFA prior to electro-optical conversion and electric amplification;
- reduced system alignment: the amount of alignment and losses due to alignment can potentially be reduced by reduced component count and co-aligning the send and receive paths from which the receive signal is extracted through a fiber optic circulator; and
- reduced system cost: the overall system cost can potentially be reduced by using conventional off-the-shelf telecom components and reduced component count.

Note that not all advantages and/or benefits will be present in all embodiments and that other advantages and/or benefits may become apparent to those skilled in the art.

This concludes the detailed description. The particular embodiments disclosed above is are illustrative only, as the invention may be modified and practiced in different but equivalent manners apparent to those skilled in the art having the benefit of the teachings herein. For instance, the circulators of the illustrated embodiments function as transmit/receive switches, and alternative embodiments may employ, for example, hole mirrors, instead. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A laser radar system, comprising:
    a fiber laser capable of generating a LADAR signal, the fiber laser including:
        a first stage capable of generating and amplifying a LADAR signal;
        a second stage capable of amplifying the LADAR signal generated by the first stage and rejecting amplified spontaneous emissions from the amplified LADAR signal;
        a third stage capable of amplifying and outputting the LADAR signal amplified by the second stage; and
        a circulator directing the LADAR signal from the first stage to the second stage and from the second stage to the third stage;
    a first optical path through which the generated LADAR signal may be transmitted;
    a second optical path through which a reflection of the transmitted LADAR signal may be received; and
    a detector capable of detecting the received reflection.

2. The laser radar system of claim 1, wherein:
    the third stage is further capable of receiving a received reflection of the LADAR signal through the second optical path; and
    the circulator is further capable of directing the received reflection output by the third stage to the detector.

3. The laser radar system of claim 1, wherein the first stage comprises:
    a directly modulated, distributed feedback laser capable of generating the LADAR signal;
    an isolator blocking backscatter to the directly modulated, distributed feedback laser; and
    a semiconductor optical amplifier capable of amplifying the LADAR signal generated by the directly modulated, distributed feedback laser and outputting the LADAR signal.

4. The laser radar system of claim 1, wherein the second stage comprises:
    a diode pump;
    an Erbium-doped, fiber amplifier pumped by the diode pump and capable of amplifying the LADAR signal generated and amplified by the first stage and outputting the amplified LADAR signal; and
    a narrow-band, fiber Bragg Grating capable of rejecting amplified spontaneous emissions from the LADAR signal amplified by the Erbium-doped, fiber amplifier before the amplified LADAR signal is output by the Erbium-doped, fiber amplifier.

5. The laser radar system of claim 1, wherein the third stage comprises:
    a diode pump; and
    an Erbium-doped, fiber amplifier pumped by the diode pump and capable of amplifying the LADAR signal amplified by the second stage and outputting the amplified LADAR signal.

6. The laser radar system of claim 1, wherein the first optical path includes a second circulator further comprising a portion of the second optical path and that is further capable of directing a received reflection of the LADAR signal to the detector.

7. The laser radar system of claim 1, wherein the first and second optical paths are independent.

8. The laser radar system of claim 1, wherein a least a portion of the first path and a portion of the second path are common and the laser radar system further comprises a transmit/receive switch joining the common portions of the first and second paths.

9. The laser radar system of claim 8, wherein the transmit/receive switch comprises the circulator.

10. The laser radar system of claim 8, wherein the transmit/receive switch comprises means for switching between the first and second optical paths.

11. The laser radar system of claim 1, wherein a least a portion of the first path and a portion of the second path are common and the laser radar system further comprises means for switching between the first and second optical paths.

12. The laser radar system of claim 11, wherein the switching means comprises a transmit/receive switch.

13. The laser radar system of claim 12, wherein the transmit/receive switch comprises the circulator.

14. The laser radar system of claim 1, wherein the laser radar system comprises a transceiver.

15. A laser radar transceiver, comprising:
    a fiber laser capable of generating a range-finding LADAR signal, including;
        a first stage capable of generating and amplifying a range-finding LADAR signal;
        a second stage capable of amplifying the range-finding LADAR signal generated by the first stage and rejecting amplified spontaneous emissions from the amplified range-finding LADAR signal;
        a third stage capable of amplifying and outputting the range-finding LADAR signal amplified by the second stage; and
        a circulator directing the range-finding LADAR signal from the first stage to the second stage and from the second stage to the third stage;
    an optical fiber path through which the range-finding LADAR signal can be transmitted and a reflection thereof received; and
    a detector capable of detecting the reflection of the transmitted range-finding LADAR signal.

16. A laser radar transceiver, comprising:
    a fiber laser capable of generating a range-finding LADAR signal, including;
        means for generating and amplifying a range-finding LADAR signal;
        means for amplifying the range-finding LADAR signal generated by the generating and amplifying means and for rejecting amplified spontaneous emissions from the amplified range-finding LADAR signal;
        means for amplifying and outputting the range-finding LADAR signal amplified by the amplifying and rejecting means; and
        means for directing the range-finding LADAR signal from the generating and amplifying means to the amplifying and rejecting means and from the amplifying and rejecting means to the amplifying and outputting means;
    an optical fiber path through which the range-finding LADAR signal can be transmitted and a reflection thereof received; and
    a detector capable of detecting the reflection of the transmitted range-finding LADAR signal.

17. A laser radar system, comprising:
a fiber laser capable of generating a LADAR signal;
  means for generating and amplifying a LADAR signal;
  means for amplifying the LADAR signal generated by the generating and amplifying means and for rejecting amplified spontaneous emissions from the amplified LADAR signal;
  means for amplifying and outputting the LADAR signal amplified by the amplifying and rejecting means; and
  means for directing the LADAR signal from the generating and amplifying means to the amplifying and rejecting means and from the amplifying and rejecting means to the amplifying and outputting means;
means for transmitting the LADAR signal;
means for receiving a reflection of the transmitted LADAR signal; and
means for detecting the received reflection.

18. The laser radar system of claim 17, wherein:
the amplifying and outputting means is further capable of receiving a received reflection of the LADAR signal; and
the directing means is further capable of directing the received reflection output by the amplifying and outputting means to the detector.

19. The laser radar system of claim 17, wherein the directing means further comprises a portion of the receiving means and is furthermore for directing a received reflection of the LADAR signal to the detector.

20. The laser radar system of claim 17, wherein the transmitting means comprises:
  a beam expander/collimator capable of shaping the LADAR signal generated by the fiber laser; and
  an optics package capable of transmitting the shaped LADAR signal.

21. The laser radar system of claim 20, wherein the transmitting means further comprises a circulator capable of directing the LADAR signal generated by the fiber laser to the beam expander/collimator.

22. The laser radar system of claim 17, wherein the receiving means comprises a receive optics package.

23. The laser radar system of claim 17, wherein the transmitting means and the receiving means are independent.

24. The laser radar system of claim 17, wherein the receiving means comprises:
  means for receiving a reflection of the LADAR signal;
  means for collimating and shaping the received reflection; and
  means for directing the shaped, received reflection of the LADAR signal to the detector.

25. The laser radar system of claim 17, wherein a least a portion of the transmitting means and the receiving means are common and the laser radar system further comprises means for switching the common portion between the transmitting means and the receiving means.

26. A laser radar transceiver, comprising:
means for generating a range-finding LADAR signal including;
  a first stage capable of generating and amplifying a range-finding LADAR signal;
  a second stage capable of amplifying the range-finding LADAR signal generated by the first stage and rejecting amplified spontaneous emissions from the amplified range-finding LADAR signal;
  a third stage capable of amplifying and outputting the range-finding LADAR signal amplified by the second stage; and
  a circulator directing the range-finding LADAR signal from the first stage to the second stage and from the second stage to the third stage;
means for transmitting the range-finding LADAR signal and for receiving a reflection thereof; and
means for detecting the reflection of the transmitted range-finding LADAR signal.

27. A laser radar transceiver, comprising:
means for generating a range-finding LADAR signal, including;
  means for generating and amplifying a range-finding LADAR signal;
  means for amplifying the range-finding LADAR signal generated by the generating and amplifying means and for rejecting amplified spontaneous emissions from the amplified range-finding LADAR signal;
  means for amplifying and outputting the range-finding LADAR signal amplified by the amplifying and rejecting means; and
  means for directing the range-finding LADAR signal from the generating and amplifying means to the amplifying and rejecting means and from the amplifying and rejecting means to the amplifying and outputting means;
means for transmitting the range-finding LADAR signal and for receiving a reflection thereof; and
means for detecting the reflection of the transmitted range-finding LADAR signal.

* * * * *

UNITED STATES PATENT AND TRADEMARK OFFICE
CERTIFICATE OF CORRECTION

| | | |
|---|---|---|
| PATENT NO. | : 7,649,616 B2 | Page 1 of 1 |
| APPLICATION NO. | : 10/886976 | |
| DATED | : January 19, 2010 | |
| INVENTOR(S) | : Michael et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1234 days.

Signed and Sealed this

Twenty-third Day of November, 2010

David J. Kappos
*Director of the United States Patent and Trademark Office*